United States Patent [19]

Utsumi et al.

[11] Patent Number: 4,647,153
[45] Date of Patent: Mar. 3, 1987

[54] IMAGE GUIDE

[75] Inventors: Atsushi Utsumi, Kawanishi; Hiroyuki Hayami, Itami, both of Japan

[73] Assignee: Dainichi-Nippon Cables Ltd., Hyogo, Japan

[21] Appl. No.: 756,931

[22] Filed: Jul. 19, 1985

Related U.S. Application Data

[63] Continuation of Ser. No. 436,687, Oct. 26, 1982, abandoned.

[30] Foreign Application Priority Data

Oct. 26, 1981 [JP] Japan .......................... 56-159933[U]
Dec. 25, 1981 [JP] Japan .......................... 56-198194[U]

[51] Int. Cl.[4] ................................................. G02B 6/06
[52] U.S. Cl. .............................. 350/96.25; 350/96.26; 350/96.34
[58] Field of Search ............. 350/96.23, 96.24, 96.34, 350/96.25, 96.26, 96.27

[56] References Cited

U.S. PATENT DOCUMENTS

| | | | |
|---|---|---|---|
| 3,699,950 | 10/1972 | Humphrey et al. | 350/96.23 |
| 4,153,333 | 5/1979 | Harada et al. | 350/96.25 |
| 4,306,767 | 12/1981 | Kawachi et al. | 350/96.34 |
| 4,334,733 | 6/1982 | Takeshima et al. | 350/96.25 |
| 4,360,372 | 11/1982 | Maciejko | 350/96.24 |

*Primary Examiner*—William L. Sikes
*Assistant Examiner*—Robert E. Wise
*Attorney, Agent, or Firm*—Wenderoth, Lind & Ponack

[57] ABSTRACT

The invention relates to improvements in an image guide using optical silica glass fibers. The improved image guide has a light shielding and light absorbing thin layer formed on the periphery of an optical fiber bundle consisting of a multiplicity of optical fibers to prevent incidence of external light from the peripheral surface of the bundle and to absorb and remove any scattered light as it is transmitted to parts other than the core of each optical fiber, thereby providing improved picture quality.

15 Claims, 4 Drawing Figures

IMAGE GUIDE

This application is a continuation of now abandoned application Ser. No. 436,687, filed Oct. 26, 1982.

BACKGROUND OF THE INVENTION

(1) Field of the Invention

The present invention relates to an image guide having a multiplicity of optical silica glass fibers fusion bonded together in side-by-side relation.

(2) Description of the Prior Art

Images guides which comprise a multiplicity of optical fibers formed into a bundle-like assembly are used for transmitting image information from one end thereof to the other.

Known approaches in practice to permit transmission of a clear image by means of an image guide are that the diameter of each of the individual optical fibers constituting the picture elements of the image guide is made as small as possible, and that the number of picture elements in a unit sectional area is made as great as possible. It is also a known practice that in order to reduce possible image distortion, the optical fibers are closely arranged and assembled in such a way that no gap is present among any adjacent fibers and that the individual fibers have their both ends positioned in exact opposed relation.

To give an example of such image guide already in practical use, there is an image guide made of multi-component glass, which is employed in an optic scope such as photogastroscopic applications. Multi-component glass can be easily formed into many optical fibers, each having a uniform outside diameter because it has a low melting point, and therefore the fibers are substantially uniform in diameter. So an image guide of the multi-component glass type can be produced in such a way that the optical fibers are densely bunched together simply by being put in alignment. However, it is impracticable to produce a long image guide of such type because of its high transmission loss. Moreover, the multi-component glass type is not heat resistant, nor is it radiation resistant, which fact renders it unsuitable for observation use in such an abnormal atmosphere as in a blast furnace or in a nuclear power plant.

In contrast with such type using multi-component glass fibers, an image guide using optical silica glass fibers which involve a lower degree of transmission loss and has good heat resistance and good radiation resistance permits observation in above said abnormal atmosphere; and moreover, optical silica glass fibers enable to produce a long image guide.

Now, optical silica glass fibers cannot be produced by drawing according to a double crucible method which is adopted for drawing of multi-component glass fibers, because silica glass has a high melting point. This makes it difficult to obtain fibers of uniform diameter. If a multiplicity of silica glass fibers are assembled into a bundle form in fabricating an image guide, therefore, it is difficult to obtain a bundle in which the multiplicity of fibers are densely arranged so that no gap is present among adjacent fibers, simply by putting them in alignment, because of the lack of diametrical uniformity among the fibers. The presence of such gaps is undesirable because it lowers the quality of the transmitted picture.

So, as a method of fabricating a silica glass image guide which has a larger number of picture elements in a unit sectional area, it has been proposed to bunch a multiplicity of optical fibers together, subject them to heating and drawing so that each of the individual fibers is fusion bonded to ones adjacent thereto, thus arranging the multiplicity of fibers into an assembly so that no gap is present among any adjacent fibers.

An image guide produced by this method is such that each of the optical fibers is fusion bonded to ones adjacent thereto; and in such image guide in which the optical fibers are highly densely arranged, the individual optical fibers are extremely fine, and this, coupled with the fact that they are fusion bonded together, each to ones adjacent thereto, substantially reduces the light shielding effect of the cladding, or the portion having the role of cladding, of each optical fiber. Therefore, when such image guide having an assembly of optical fibers fusion bonded together is used, there is a problem that the ingress of light beams from external sources into the core of each optical fiber reduces the contrast of a transmitted picture, making it difficult to obtain transmission of a picture of good visibility.

As an approach to solve this problem, providing about each optical fiber a thin layer or coating of light absorbing glass to prevent light transmission between adjacent cores, as disclosed in U.S. Pat. No. 2,825,260, may be thought of, but provision of such light absorbing layer or coating on an optical silica glass fiber is impractical since a light absorbing glass having a thermal coefficient of expansion comparable to that of silica glass, a material having a very small thermal coefficient of expansion, is not available and since such coating, if provided, may easily come off.

In order to solve said problem, an attempt has been made to use an image guide as inserted in a pipe of a light sealing material, e.g. a stainless steel pipe, but one difficulty with this approach is that an air layer present between the inner surface of the pipe and the surface of the image guide may irregularly reflect optical cross talk from each optical fiber for the mirror effect thereof, and the irregularly reflected light in turn may re-enter the cores of optical fibers, so that the visibility of transmitted pictures may be adversely affected. Another difficulty is that such air layer is likely to act as a medium for transmission of light entering through the inlet of the stainless pipe, thus degrading the contrast of the transmitted picture. Furthermore, light incident upon the core at a larger angle of incidence than a numerical aperture determined by a reflective index differential between the core and the cladding of the optical fiber breaks through the core into the cladding, then reaching the outer periphery of the image guide, after reflected by the outer periphery, the light goes back into the image guide. Through such process of repeated reflection between one side and the other of the outer periphery, said light is transmitted through the image guide.

Such incident light degrades the quality of the transmitted picture. Moreover, in the course of such repeated reflection on the outer periphery, the angle of incidence of such light relative to the optical fiber may change to cause such light to transmit noise through the core. Thus, a faithful transmission of a picture cannot be achieved.

As above stated, an image guide consisting of optical silica glass fibers, each fusion bonded to others adjacent thereto, has advantageous features such as being less liable to transmission loss, highly heat resistant and highly radiation resistant, on one hand, but on the other hand, it involves factors which may adversely affect the quality of transmitted pictures, and this has prevented the practical application of such image guide.

OBJECT OF THE INVENTION

The present invention is intended to provide a solution to the problems inherent to image guides of the type that uses optical silica glass fibers, which are fusion bonded to adjacent ones each other. Accordingly, it is a primary object of the invention to provide an image guide which prevents entry of external light and absorbs leakage light from the core and light incident from one end of the image guide, when such light reaches the outer periphery. Said prevention and absorption of light reduce stray light that may develop into optical information noise to permit transmission of high quality pictures of good visibility.

Another object of the invention is to provide a highly heat-resistant image guide which effectively exhibits high heat resistance, a feature characteristic of the optical silica glass fibers.

A further object of the invention is to provide an image guide, for observation of high-temperature objects, which can be manufactured at a high yield and which is not liable to any drop in the light-shielding and light-absorbing capacity under any mechanical stress during installation or operation.

The above and further objects and novel features of the invention will more fully be apparent from the following detailed description when the same is read in connection with the accompanying drawings.

DETAILED DESCRIPTION OF THE INVENTION

The basic characteristic of an image guide according to the present invention is that optical fibers of above said silica glass type are formed into a bundle-like assembly by bonding them together and a thin layer having light shielding and light absorbing properties is provided on the outer periphery of said bundle-like assembly.

Figure 1:
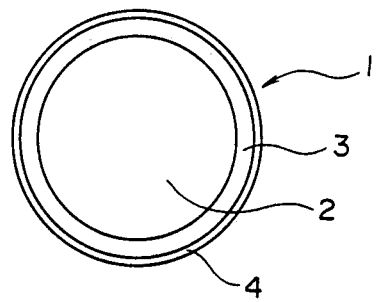
FIG. 1 is a sectional view of an optical fiber.

The invention will now be described in more details with reference to the embodiments thereof. Referring first to FIG. 1 there is shown a structural configuration of an optical fiber 1, which consists essentially of a core 2 of pure silica glass having a refractive index of 1.4585, a cladding 3 of pure silica glass provided on the exterior of the core 2, said cladding 3 being doped with boron oxide ($B_2O_3$) and having a refractive index of 1.4540, and a support layer of synthetic silica glass provided on the exterior of the cladding 3.

Figure 2:
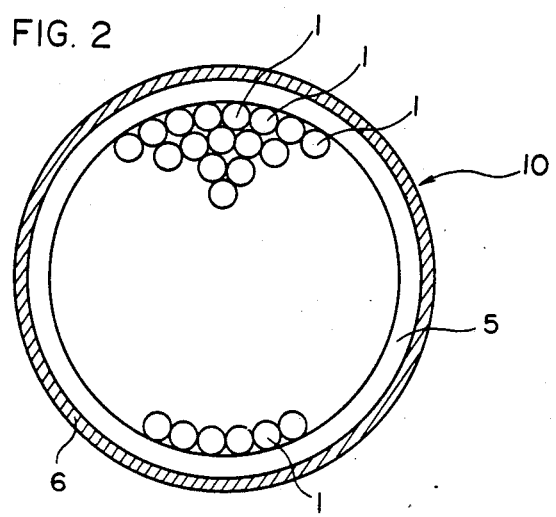
FIG. 2 is a section of an image guide embodying the invention.

An image guide 10 of the invention is composed essentially of a multiplicity of such optical fibers and is of such structural configuration as illustrated in FIG. 2. That is, the image guide 10 comprises a multiplicity of optical fibers 1 of the silica glass bonded together and arranged in a bundle-form assembly, a tubular skin layer 5 of synthetic silica glass enclosing the so assembled optical fibers 1, and a thin layer 6 formed on the outer periphery of the skin layer 5 and having light shielding and light absorbing properties. Such image guide 10 is produced in such a way that a multiplicity of optical fibers 1 is packed in alignment into a synthetic silica glass pipe which forms a skin layer 5, then heated and drawn, and black paint, for example, is coated on the outer periphery of the skin layer 5 and over its entire length to form a thin layer 6. Said method of producing is quite simple.

Another method explained hereinafter is preferable for producing an image guide that is composed of greater number of optical fibers. The method of producing will now be explained in detail. About 7~200 ends of optical fibers 1, each of suitable thickness, are bundled, and the bundle of the fibers is drawn under heat, from one end thereof, to form an intermediate in such manner that individual adjacent optical fibers 1 are fusion bonded to one another on their respective support layers 4 and that the entire bundle is reduced to a prescribed diametral size. Such intermediates are bundled in such number as may be necessary to have a prescribed total number of optical fiber 1 contained in the bundle, and a suitable interposing material is interposed between individual intermediates. The bundle of intermediates is drawn under heat from one end thereof in same manner as above described and without any void being formed on the interface between the individual intermediates, so that the bundle is formed into an assembly 7 wherein individual adjacent optical fibers 1 have been fusion bonded to one another on their respective support layers 4 and wherein the assembly 7 has a prescribed diametral size. If a larger number of optical fibers 1 are required to form an assembly 7, and if a larger number of intermediates than the prescribed number are needed to meet such requirement, 7 to 200 intermediates are bundled and the bundle is drawn according to the above described process and the resulting assembly is treated as an intermediate. Through repetition of such process, an assembly 7 including the desired number of optical fibers 1 is obtained. Generally, the required number of optical fibers for an assembly is ten thousand to tens of thousands and the diametral size required of the assembly is 1~5 mm.

As an interposing material to be placed in the clearance between the individual intermediated in the process of drawing the bundled intermediates may be used any material of low volatility which has a boiling point of 1200° C. or below and which is in liquid form with a viscosity of $10^2$ poise or below at about 1800° C. (drawing temperature). For example, inorganic oxides, such as $B_2O_3$ and $GeO_2$, known as glass forming oxides, and inorganic oxides, such as $S_nO_2$, $SbO_2$, $BaO_2$, and $TiO_2$, known as glass modified oxides or intermediate oxides are suitable for this purpose. One of these oxides or a mixture of two or more kinds of them may be used in solid, liquid or powder form. When used in solid form, such material is formed into wire. When such material is used in liquid form, the bundle of intermediates is immersed in the liquid. When used in powder form, such material is interposed by using carrier gas such as $O_2$ or $N_2$.

Alternatively, in place of such interposing material, a precursor thereof, that is, a material which can be formed into an interposing material by decomposition, oxidation, or other chemical reaction, e.g., an acid, carbonate, nitrate, sulfate, halide, hydroxide, salt of organic acid, chelate compound, or the like of such interposing material, may be interposed in the clearance between individual intermediates.

If a bundle of intermediates, with such interposing material interposed between individual intermediates, is drawn, lubricating action of the interposed material, as well as the force of pull under surface tension, makes it possible to obtain a void free assembly of optical fibers. The interposed material which remains between individual optical fibers 1 functions as a cladding layer to prevent light leakage from the core.

In the process described above, a plurality of intermediates are bundled and drawn to obtain an image guide.

According to the present invention, the optical fibers constituting an image guide are not particularly limited; each component fiber may be one having a refractive index profile of the step index type or graded index type. Each component fiber may be with or without a support layer. Further, it is possible that the core of each fiber may include one or more kinds of known dopant, together with a cladding.

After drawing is carried out as above described, a thin layer 6 is formed. There is no particular limitation for a material forming such layer, provided that the material has light absorbing properties, particularly with respect to infrared light, visible light and ultraviolet light transmitted through the image guide, and also has light shielding properties. Therefore, covering materials ranging in color from dark brown to black can be used for such layer. For example organic or inorganic black paint, coal tar, carbon soot, and black rubber or plastic are suitable. The thickness of thin layer 6 may vary according to the material used. It may be acceptable if the thickness is sufficient to shield external light. Where black paint is used, the thickness of such layer in dry coating form is about 0.5~1 mm.

Figure 3:
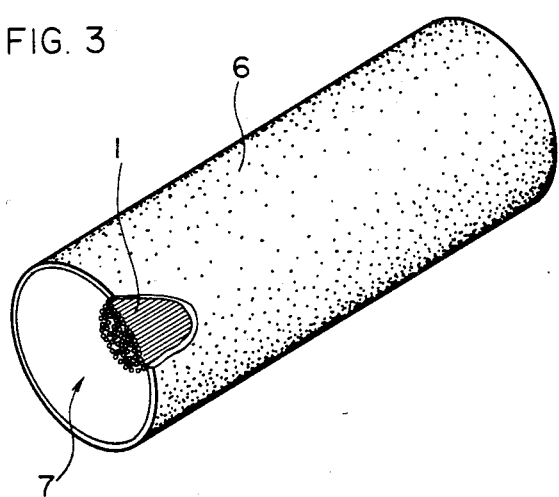
FIG. 3 is a perspective view, partially cut away, of the image guide, with a skin layer omitted.

FIG. 3 shows an embodiment wherein no such skin layer as above described is provided on the outer periphery of the assembly 7 of optical fibers, there being formed a thin layer 6 directly on said outer periphery.

As stated earlier, the optical silica glass fiber is highly heat resistant, and therefore it is possible to obtain an image guide adapted to advantageously utilize the characteristic features of optical silica glass fibers, if the thin layer 6 is formed by heat resisting materials. A heat-resistant thin layer 6 is formed in manner as follows. That is, an organic coating composition containing one or more kinds of material selected from the group consisting of carbon pigment, copper oxide, manganese oxide, nickel oxide, cobalt oxide and iron oxide is coated to the required thickness on the periphery of the assembly 7 shown in FIG. 3 (or skin layer 5 in FIG. 2), and then the assembly 7 so coated, is passed, as it is, through a heating furnace, in which it is heated and baked at about 500° C. under a non-oxygen atmosphere, e.g., $N_2$ atmosphere, whereby the solvent in the coating is evaporated and concurrently the polymer content is carbonized, so that a heat resistant black coat is formed which is in intimate bond with the peripheral surface of the assembly, there being no clearance present therebetween. The constituent material of the thin layer 6 should be selected such that if the assembly 7 is bent or subjected to a direct impact, it serves to protect the peripheral surface of the assembly 7 without getting cracked to peel off from the peripheral surface of the assembly 7 and at same time to absorb and eliminate any scattered light transmitted through the assembly 7 while keeping its bond with the peripheral surface of the assembly 7. To this end, therefore, a suitable material should be selected, allowing for the intended location for use and other appropriate factors, if any.

As above described, by virtue of the presence of the thin layer 6 the image guide according to the invention is not liable to entry of external light thereinto. Any light incident upon the core from the end surface of the assembly 7 and at an angle greater than the numerical aperture of the optical fiber will reach the thin layer 6 while it is going astray and will be absorbed thereinto. This eliminates the possible cause of degradation of image quality, and accordingly permits transmission of a clear picture. Furthermore, since optical silica glass fiber is used, the invention provides an image guide which can transmit a clear image to a remote location and which is well adapted for observation under hot or radiation atmosphere.

Figure 4:
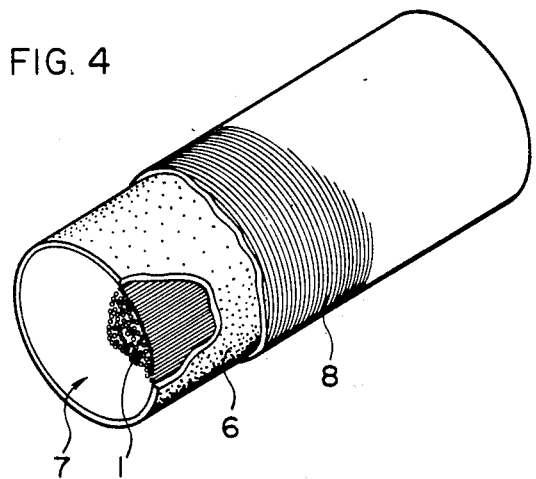
FIG. 4 is a partially broken perspective view showing another embodiment.

FIG. 4 shows another embodiment of the invention. In this embodiment, a protective layer 8 of a heat resistant material is provided on the exterior of said thin layer 6 of a heat resistant material to increase the peel resistance and adherence of the thin layer 6 relative to the peripheral surface of the assembly 7 and further to increase heat resistance thereof. In FIG. 4, the reference numeral 1 designates optical silica glass fibers, 7 designates an assembly of optical fibers 1, and 6 designates a thin layer. These components are same as those shown in FIG. 3. The protective layer 8 is formed of a heat resistant material, e.g. silica glass fiber, being in close bond with the peripheral surface of the thin layer 6. It is formed in the following way. A coating medium containing one or more kinds of such material as carbon pigment is coated on the peripheral surface of the assembly 7, and when the coat is set, silica glass fibers are wrapped closely around the coat so as to cover the entire periphery thereof; and the resulting assembly is heated and baked as it is in a heating furnace at about 500° C. under a $N_2$ atmosphere.

Instead of wrapping silica glass fibers 1 (of about 10 μm dia), a heat resisting material, closely around the coat, the protective layer 8 may be formed by placing such fibers in woven, non-woven, or knitted form to cover the coat surface, or by similarly covering the coat surface with other material than silica glass fiber, for example, multi-component glass fiber, carbon fiber, or the like.

By providing a protective layer 8 as such, it is possible to improve the peel resistance and adherence of the thin layer 6, thereby preventing the peel-off of the thin layer 6 in the event of the assembly being bend or its contact with any peripheral object, so that handling can be made very easier. Furthermore, in the process of producing the image guide of the invention, that is, baking the coat, any possible damage to the heat resistant black coat at softened state can be prevented. In addition, the fact that both the thin layer 6 and the protective layer 8 are highly heat resistant makes it possible to obtain a highly durable image guide for observation of hot objects.

Next, explanation will be made of the test results on the image guide of the invention, and more particularly one having a heat resistant thin layer, in comparison with conventional image guide.

(1) Test specimens (a) Products of the invention:

One product made in such a way that 10,000 ends of optical fiber were drawn into an assembly in which the total diameter was 1.5 mm and in which individual adjacent optical fibers were fusion bonded to one another, with a thin layer of carbon polymer provided thereon (Product 1 of the invention); one having a protective layer of silica glass fiber provided thereon (Product 2 of the invention); and one such that a ceramic adhesive composed principally of $SiO_2$ and $Al_2O_3$ was applied to the silica glass fiber layer and the resulting assembly was heat treated at 500° C. (Product 3 of the invention).

(i) Components of the optical fiber

Core: high-purity synthetic silica glass (99.9999 SiO glass)

Cladding: glass containing $B_2O_3$ (3%), F (1%) and $SiO_2$ (96)

Support layer: natural silica glass (99.9% $SiO_2$ glass)

(ii) Coating material for forming the thin layer: an organic paint containing 20% of carbon pigment.

(iii) Thickness of thin layer: 0.1 mm (b) Comparative image guide: Same assembly as used in the present invention was used as specimen without coating thereon.

(2) Test conditions

An assembly, 50 cm in length, was subjected to optical grinding. An objective lens having a focus distance of 5 mm was arranged at one end of the assembly and an eye lens having a focus distance of 17 mm was arranged at the other end, thus a fiber scope being obtained. A test chart for measurement according to Standards of Electronic Industries Association of Japan (EIAJ) was arranged at a distance of 100 mm from the objective lens of the fiber scope. Same was observed visually through the eye lens to determine the limit to which the black lines on the test chart can be identified, that is, degree of resolution. The fiber scope was heated by a burner until the thin layer peeled off and the temperature at that moment was measured.

(3) Test results: as shown in Table 1

|  | Resolution | Peeling temperature for light shielding layer |
|---|---|---|
| Product 1 of the Invention | 300 | When heated to 400° C., black thin layer peeled off. |
| Product 2 of the Invention | 300 | When heated to 600° C., black thin layer peeled off. |
| Product 3 of the Invention | 300 | When heated to 1000° C., black thin layer peeled off. |
| Conventional | 150 |  |

As is apparent from the above results, the Product 1, 2 and 3 of the invention provide much improved resolution, two times that of the conventional image guide. They have also very high heat resistance, 400° C. minimum and up to 1000° C.

Ideally, the thin layer 6 should be fixedly provided over the entire length of the assembly. Practically, however, partial presence of air may be acceptable.

In the case where the assembly is enclosed in a suitable pipe or tube, there is almost no possibility of stray light entering the assembly from the peripheral surface thereof, such light entering mostly from one end of the assembly. Therefore, for the purpose of absorbing such stray light, a thin layer may be sufficient which is provided over a suitable length from said one end. In other words, a pipe or tube is used in combination, the thin layer need not be formed over the entire length of the assembly.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

What is claimed is:

1. An image guide consisting essentially of a thin layer formed on the outer periphery of a bundle-form assembly comprising a multiplicity of optical silica glass fibers, said layer having light shielding and light absorption properties, said silica glass fibers comprising a core made of substantially pure silica, a cladding around said core made of silica glass doped with $B_2O_3$ or $B_2O_3$ and F and a support layer around said cladding made of silica glass, the support layers of adjacent fibers being fusion bonded to each other and there being no clearance between said thin layer and said bundle-form assembly.

2. An image guide as set forth in claim 1, wherein said thin layer is heat resistant.

3. An image guide as set forth in claim 2, wherein on the outer side of said thin layer there is provided a protective layer formed of a heat-resistant material.

4. An image guide as set forth in claim 1, wherein said thin layer is bonded to the outer surface of the bundle-form assembly.

5. An image guide as set forth in claim 4, wherein said thin layers is of organic or inorganic black paint, coal tar, carbon soot, black rubber, or black plastic.

6. An image guide as set forth in claim 4, wherein said thin layer contains one or more kinds of materials such as carbon pigment, copper oxide, manganese oxide, nickel oxide, cobalt oxide, and iron oxide.

7. An image guide as set forth in claim 6, wherein on the outer side of said thin layer there is provided a protective layer formed of a heat-resistant material.

8. An image guide as set forth in claim 1, wherein said thin layer is bonded to the outer periphery of a tubular skin layer enclosing said bundle-form assembly.

9. An image guide as set forth in claim 8, wherein said thin layer is of organic or inorganic black paint, coal tar, carbon soot, black rubber, or black plastic.

10. An image guide as set forth in claim 8, wherein said thin layer contains one or more kinds of materials such as carbon pigment, copper oxide, manganese oxide, nickel oxide, cobalt oxide, and iron oxide.

11. An image guide as set forth in claim 10, wherein on the outer side of said thin layer there is provided a protective layer formed of a heat-resistant material.

12. An image guide as set forth in claim 1, wherein said thin layer is of organic or inorganic black paint, coal tar, carbon soot, black rubber, or black plastic.

13. An image guide as set forth in claim 1, wherein said thin layer contains one or more kinds of materials such as carbon pigment, copper oxide, manganese oxide, nickel oxide, cobalt oxide, and iron oxide.

14. An image guide as set forth in claim 13, wherein on the outer side of said thin layer there is provided a protective layer formed of a heat-resistant material.

15. The image guide according to claim 1 wherein there is employed 3% $B_2O_3$ and 1% F.

* * * * *